July 17, 1928.

Re. 17,040

L. J. KIRCHENBAUER

CRANK PIN LATHE

Original Filed July 11, 1919 4 Sheets-Sheet 1

INVENTOR

Louis J. Kirchenbauer

BY

Allen & Allen

ATTORNEYS

July 17, 1928. Re. 17,040

L. J. KIRCHENBAUER

CRANK PIN LATHE

Original Filed July 11, 1919 4 Sheets-Sheet 2

INVENTOR.

Louis J. Kirchenbauer

BY

Wesley Allen

ATTORNEYS

July 17, 1928.

Re. 17,040

L. J. KIRCHENBAUER

CRANK PIN LATHE

Original Filed July 11, 1919 4 Sheets-Sheet 3

INVENTOR.

Louis J. Kirchenbauer

BY

Albert Allen

ATTORNEYS

July 17, 1928.

Re. 17,040

L. J. KIRCHENBAUER

CRANK PIN LATHE

Original Filed July 11, 1919 4 Sheets-Sheet 4

INVENTOR.

Louis J. Kirchenbauer

BY

Allen & Allen

ATTORNEYS

Reissued July 17, 1928. Re. 17,040

UNITED STATES PATENT OFFICE.

LOUIS J. KIRCHENBAUER, OF CHICAGO, ILLINOIS, ASSIGNOR, BY MESNE ASSIGNMENTS, TO THE R. K. LE BLOND MACHINE TOOL COMPANY.

CRANK-PIN LATHE.

Original No. 1,372,075, dated March 22, 1921, Serial No. 310,149, filed July 11, 1919. Application for reissue filed February 29, 1928. Serial No. 258,110.

My invention relates to crank pin lathes, and has for one of its objects the provision of a device adapted to hold and turn the crank pins of crank shafts having a plurality of such crank pins.

A further object is the provision of a simple and efficient means of moving a plurality of tools in accordance with the movement of crank pins while the latter are being turned.

A still further object is the provision of a simple and efficient machine as set forth in the following description.

Other objects will appear hereinafter.

In the drawings:—

Figure 1:
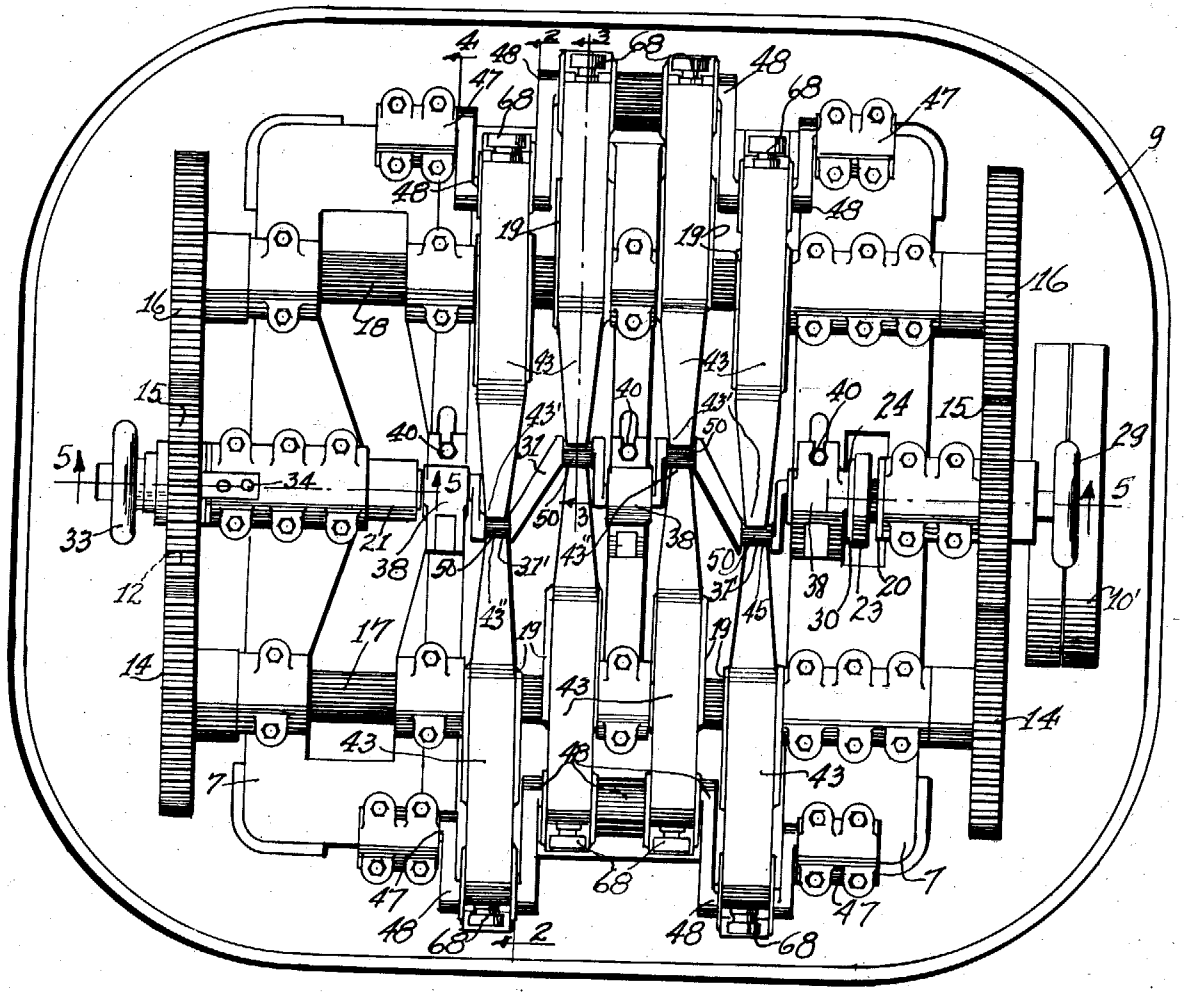
Figure 1 is a plan view of a lathe embodying my invention.

Figures 3, 4, 5 and 6 are enlarged fragmental views taken on lines 3—3, 4—4, 5—5 and 6—6, respectively, of Fig. 1.

Figure 2:
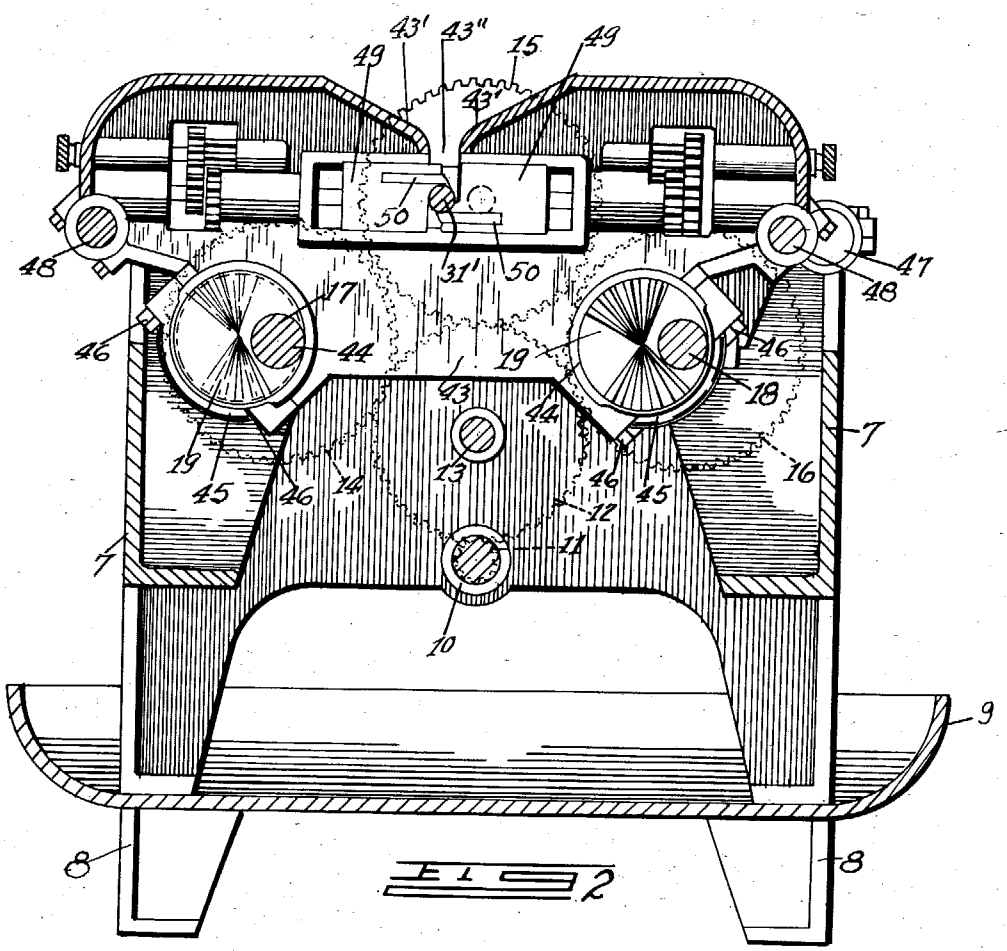
Figure 2 is a section of the same taken on line 2—2 of Fig. 1.

Referring more particularly to the drawings, I have indicated a frame 7 suitable for supporting the device. The frame may be made up of two parts, as indicated in Fig. 2, with a bottom portion 8 having a pan 9 for the reception of cuttings, oil, and the like, or the entire frame may be made in any desirable manner.

Near the central part of frame 7 and extending longitudinally of the latter is a driving shaft 10 on which is fixed a pinion 11, and the latter meshes with a gear 12 fixed on a shaft 13 substantially parallel with the shaft 10. Meshing with the gear 12 are three gears 14, 15 and 16 similar in size and each adapted to be driven by the gear 12. I prefer to use a set of gears 11, 12, 14, 15 and 16 at each end of the device, as clearly indicated in Fig. 1.

The gears 14 are fixed on an eccentric shaft 17, and the gears 16 are fixed on an eccentric shaft 18. The shafts 17 and 18 are substantially parallel with shaft 13. On each of the shafts 17 and 18 are eccentrics 19, the number of eccentrics on each shaft corresponding to the number of crank pins which will be on the engine crank. The eccentrics 19 may be secured to the shafts 17 and 18 in any desirable manner.

One of the gears 15 is fixed on a sleeve 20, and the other of the gears 15 is splined on a sleeve 21. The sleeves 20 and 21 are journaled in suitable bearings in the frame 7, as clearly indicated in Figs. 5 and 6.

In the sleeve 20 is splined a shaft 22 which has a flange 23 at one end thereof with pins 24 in said flange. The other end of the shaft 22 is hollow with threads 25 therein engaging a screw 26. The screw 26 is held against longitudinal movement in the sleeve 20 by a flange 27 and the hub 28 of a hand wheel 29. The arrangement is such that upon rotating the hand wheel 29 the shaft 22 will be moved longitudinally in the sleeve 20. This movement is desirable for engaging the pins 24 and flange 23 with the flange 30 of an engine crank shaft 31 which is to be turned.

In the sleeve 21 is splined a shaft 32 which has a hand wheel 33 fixed on one end in any desirable manner. The gear 15 on the sleeve 21 is held against longitudinal movement thereon by a member 34 engaging a circumferential groove 35 in the hub of said gear. The other end of the shaft 32 is threaded in the hollow end 36 of a compression chuck 37, one end of the sleeve 21 being tapered correspondingly with the chuck 37. The chuck 37 is of a size to fit one end of the crank shaft 31.

The frame 7 is provided with a plurality of bearings 38 corresponding in number to the bearings on the crank shaft to be turned. The bearings are adapted to hold the crank shaft 31 against springing while the crank pins 31′ thereof are being turned. The bearing 38 may be formed in any desirable manner, but I prefer to make the lower half of each bearing integral with the frame 7 and the upper half pivoted at one side on a pin 39 and held to the lower half by a bolt 40 which is pivoted as at 41 to the frame 7. A nut 42 is threaded on the bolt for tightly clamping the upper half to the lower half of said bearing. The ends of the bearing halves are slotted for the swinging of the bolt 40 on the pin 41 into and out of clamping relation with said bearing. This indicates one suitable means for rendering the bearings easily and quickly opened and closed for adjusting the crank shafts into and out of the machine. It will be apparent that the bearings and the means for rotating the crank shaft above referred to may be changed without departing from the spirit of my invention, these forms being simply to indicate one means for holding and rotating the crank shafts while the crank pins are being turned.

A tool-holding member 43 is supplied for each crank pin of the engine crank shaft 31. Each tool holder 43 is journaled on one eccentric 19 on shaft 17 and one eccentric 19 on shaft 18 so that as the shafts 17 and 18 rotate the eccentrics 19 cause the tool holder 43 to describe or move corresponding to the movements of the crank pins 31′. The tool holder 43 may be attached in any desirable manner to the eccentrics 19, and I have shown an efficient way by having one-half 44 of each bearing formed integral with the tool holder 43, and the other halves 45 secured to the halves 44 by cap screws 46.

Figure 3:
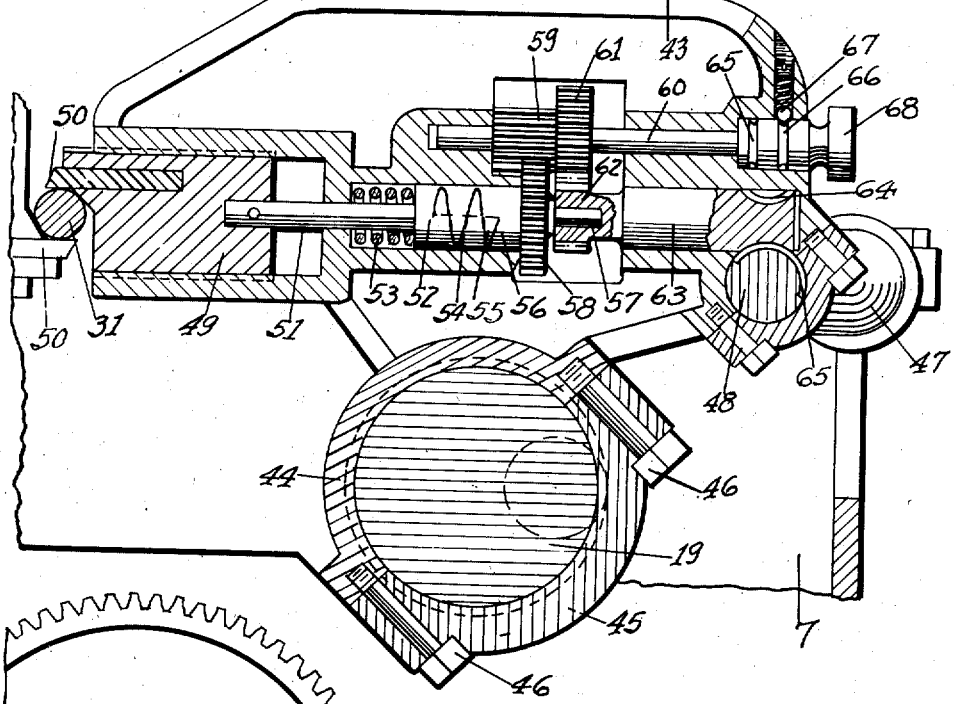
Figure 4:
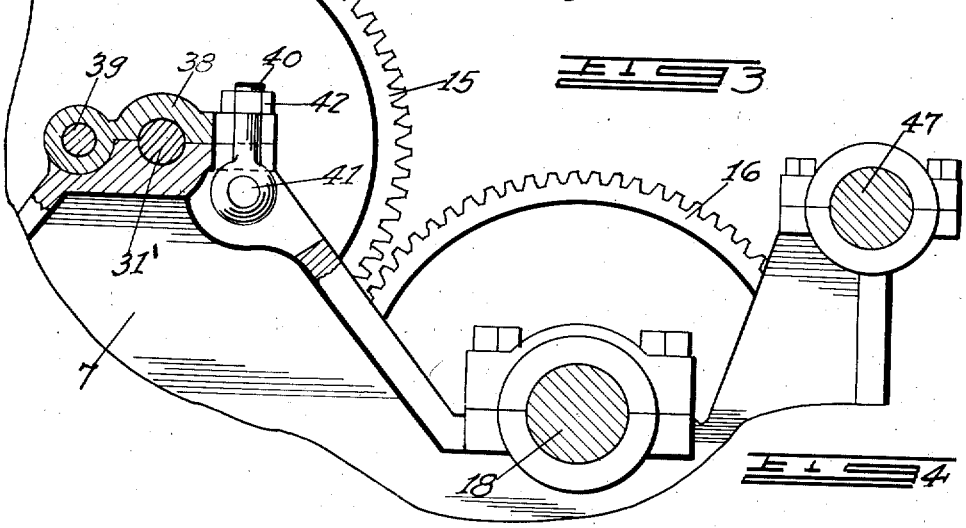
Figure 5:
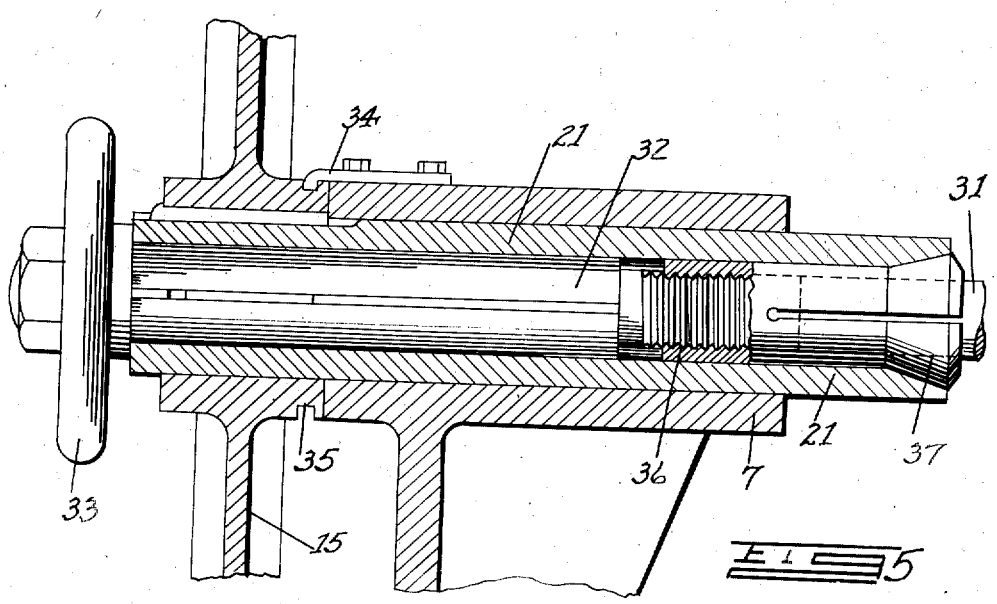
Figure 6:
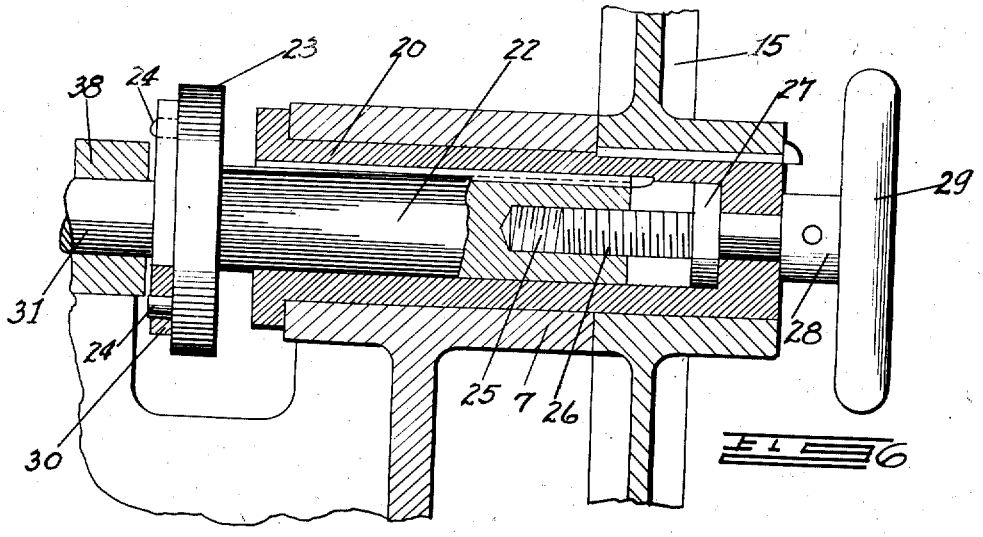

Two crank shafts 47 are mounted in the frame 7 in any desirable manner, such as indicated in Figs. 3 and 4. The crank shafts 47 are formed with the throws of their crank pins 48 equal to the throws of the eccentrics 19 and the crank pins 31′ so that rotation of the shafts 17 and 18 and movement of the tool holder rotates the crank shafts 47. With the crank shafts 47 and eccentrics 19 the tool holders 43 will be held firm and move in such a manner as to cause the tools to properly cut the crank pins 31′.

Slidably mounted in the tool holder 43 are two blocks 49 each adapted to slide toward and away from the adjacent crank pin 31′. Each tool block 49 is provided with a suitable tool 50 for cutting its pin 31′, as desired. It will be apparent in this connection that a cutting, grinding or polishing tool, or any combination of them may be represented by the parts 50. The two blocks 49 on each tool holder 43 are automatically fed toward the crank pin 31′ so that one complete movement toward the crank pin 31′ finishes such pin. Each block 49 is provided with a stem 51 extending outwardly of the machine. At the outer ends of the stems 51 are heads 52, and between the heads 5ª and portions of the tool holder 43 are compression springs 53 which normally tend to press the blocks 49 away from the crank pins 31′. The end of the head 52 is provided with a spiral surface 54 which engages a correspondingly formed surface 55 on a head 56. The head 56 is carried on a spindle 57 and provided with a gear 58 which meshes with a gear 59. The gear 59 is fixed on a shaft 60 and capable of longitudinal movement. Also, on the shaft 60 is a gear 61 which meshes with a pinion 62 on a shaft 63, and the shaft 63 has formed therein worm gear teeth 64. The worm gear teeth 64 mesh with a worm 65 formed on the adjacent crank pin 48. The arrangement is such that as a crank shaft 47 rotates, the rotary movement of one of its crank pins 48 imparts motion to a shaft 63 and through the gears 62, 61, 59 and 58 rotates the head 56 so that the spiral surface 55 moves on the spiral surface 54 to press the stem 61 and tool block 49 inwardly toward a crank pin 31′. Each tool block 49 has its own feeding mechanism similar to that just described so that each block 49 is fed independently toward its particular crank pin 31′, and since the crank shafts 47 are so mounted as to be rotated with the eccentric shafts, and the latter being geared together, all of the tools are fed toward the crank pins at the same time.

The shaft 60 is provided with two circumferential grooves 65 and 66, and a spring-pressed ball 67 mounted in the frame 7 in such a manner as to engage the grooves 65 and 66, one at a time. When the groove 66 is in engagement with the ball 67, as indicated in Fig. 3, the gears 62 and 61 are in mesh with each other, and when the shaft 60 is pulled out by means of the hand wheel 68 until the ball 67 engages the groove 65, the gears 61 and 62 will be out of mesh so that the tool block 49 can be moved manually in order to adjust or renew a tool 50, or for any purpose desired.

In use the hand wheels 29 and 33 are rotated to move the flange 23 and compression chuck 37 toward the gears 15 to permit a crank 31 to be inserted between said chuck and flange. One end of the crank shaft 31 is inserted in the chuck 37 and the hand wheel 33 operated to tighten said crank shaft in the chuck. The hand wheel 29 is then turned to move the flange 23 up against the flange 30 of the crank shaft 31. The pins 24 are adapted to engage the fly wheel securing perforations of the flange 30, thereby insuring the rotation of the crank shaft 31. The bearings 38 are adjusted about the bearings of the crank shaft 31 and the latter arranged so that the tools 50 will begin their cut in a proper manner. Then as the shaft 10 is rotated by the pulley 10′ from any suitable source of power, the crank shaft 31 is rotated and all of the tools 50 caused to follow the crank shaft 31 and cut the pins 31′ as required. The cutters 50 are arranged in pairs so that one cutter cuts on the under side of the crank pin, and the other cutter cuts on the upper side of the crank pin, the distance between each pair of cutters being the diameter of the crank pin 31′, see Fig. 3. In this figure the tools 50 are indicated as being at the end of the cut and the inclined surfaces 54 and 55 about to become disengaged. In Fig. 3 when the head 56 is rotated a short distance farther, the surfaces 54 and 55 will become disengaged and the head 52 moved outwardly by the spring 53 ready to begin a new cut or new crank pin. The feeding arrangement from crank pin 48 automatically effects cutting the crank pin 31′ to its proper size when once set. Should a tool become damaged or out of proper adjustment the operator by moving the shaft 60 longitudinally with hand wheel 68 can disengage the gears 61 and 62 as hereinbefore mentioned so that the tool can be properly set or renewed. When the crank pins are finished the bearings 38 and the compression chuck 37 and flange 33 are moved so as to free the crank shaft and permit the insertion of another one when the cycle of movement will begin again.

The ends 43′ of the parts of the tool holder immediately above the tool blocks 49 are spaced apart as at 43′ so as to permit the passage of a crank shaft 31 when the latter is in proper shape, but if the crank shaft is bent or warped, the parts 43′ will prevent the crank shaft being inserted into place in the bearings 38. This serves as a gage for determining whether or not the crank shaft is in proper shape for finishing.

The tool blocks 49 and the tools 50 are so arranged that the space between the tools 50 will determine the diameters of the crank pins 31′. Therefore in operation the points of the tools pass by the centers of the crank pins, as clearly indicated in Figs. 2 and 3. This insures making all of the crank pins of uniform size. It will be apparent that the tool blocks 49 may be provided with guides at one side only, instead of the two sides, as shown. It is desirable, however, that one tool 50 should cut on the upper side of the crank pin 31′, and the other tool 50 of each pair cut on the lower side of the same crank pin, and each tool cut substantially one-half of the crank pin, including the straight part and the radius.

An important feature of the device is that the bearings 38 fit the bearings of the engine shaft 31 in a manner similar to that in which the crank shaft is mounted in an engine, and these bearings 38 hold the shaft against springing while the crank pins 31′ are being cut.

I claim:—

1. A crank shaft lathe comprising a frame; crank shaft holders journaled in the frame; a rotatable element journaled in the frame and connected with the crank shaft holders for simultaneous movement; a tool block reciprocally mounted in the rotatable element; resilient means tending to hold the tool block away from work in the crank shaft holders; and automatic feeding means in said rotatable element adapted to feed the tool block toward work in the crank shaft holders.

2. A crank shaft lathe comprising a frame; crank shaft holders journaled in the frame; a rotatable element journaled in the frame and connected with the crank shaft holders; two tool blocks slidably mounted in the rotatable element; resilient means tending to press the tool blocks away from each other; and feeding means operable by the movement of the rotatable element adapted to move the tool holders toward each other.

3. A crank shaft lathe comprising a frame; crank shaft supporting and rotating means in said frame; shafts at opposite sides of the crank shaft supporting and rotating means; cranks in said shafts; a tool holder mounted on said cranks and connected with said crank shaft supporting and rotating means for rotating at the same speed as the latter; and a tool mounted in said tool holder and operatively connected with one of said shafts for movement in the tool holder.

4. A crank shaft lathe comprising a frame; crank shaft rotating means journaled in said frame; shafts at opposite sides of said crank shaft rotating means; a tool holder mounted on said shafts eccentrically to the axes of the latter and each point in said tool holder being adapted for movement in a circle upon rotation of the shafts; a tool slidably mounted in the tool holder; and means connecting the tool with one of said shafts for moving said tool continuously in one direction while cutting a crank pin.

5. A crank shaft lathe comprising a frame; crank shaft holders journaled in the frame; a tool block mounted on the frame and adapted to move in conformity with a crank pin of a crank shaft in the crank shaft holders; resilient means tending to move the tool block away from said crank pin; and means for automatically moving the tool block toward said crank pin.

6. A crank shaft lathe comprising a frame; crank shaft holders journaled in the frame; an element mounted in the frame with each point thereof adapted to rotate in a circle equal to that described by a point in the axis of a crank pin of a crank shaft mounted in the crank shaft holders; tool blocks slidably mounted in said element; springs one acting on each of the tool blocks tending to quickly return the latter to initial positions; and automatic feeding means operating on the tool holders for moving the latter in their feeding directions.

7. A crank shaft lathe comprising a frame; crank shaft holders journaled in the frame; an eccentric shaft on each side of a vertical plane passing through the axis of the crank shaft holders, the eccentric shafts being connected to rotate in unison with the crank shaft holders; a member journaled on the eccentric shafts; and a tool block mounted in said member and adapted for movement toward and away from a crank pin of a crank shaft in the crank shaft holders.

8. A crank shaft lathe comprising a frame; spaced crank shaft holders journaled in the frame and adapted to hold the ends of a crank shaft; bearings in the frame between the crank shaft holders adapted to engage the journals of the crank shaft; and cutting tools mounted on the frame and connected with the crank shaft holders for simultaneous operation with the latter.

9. A crank shaft lathe comprising a frame; a shaft journaled in the frame; a flange on the shaft and adapted to engage the flange of an engine crank shaft; a compression chuck rotatably mounted in the frame and connected to rotate with said shaft and flange; and crank shaft bearings in the frame between and in axial alinement with the compression chuck and shaft.

10. A crank shaft lathe comprising a frame; a shaft journaled in the frame; a flange on the shaft and adapted to engage the flange of an engine crank shaft; a compression chuck rotatably mounted in the frame and connected to rotate with said shaft and flange; crank shaft bearings in the frame between and in axial alinement with the compression chuck and shaft; and a tool mounted in the frame and operatively connected with said shaft and compression chuck.

11. A crank shaft lathe comprising a frame; two spaced shafts journaled in said frame; cranks on said shafts; a tool holder mounted on said cranks; crank shaft bearings in the frame adapted to engage the journal surfaces of a crank shaft, the axis of said bearings being disposed between said shafts; a crank shaft in said bearings having a crank pin extending through said tool holder; a tool in the tool holder; and means for moving the tool holder toward the crank pin of said crank shaft.

12. A crank shaft lathe comprising a frame; alining bearings in the frame adapted to hold all of the main journals of an engine crank shaft; a plurality of shafts disposed at the sides of the axis of said bearings; a tool holder mounted on all of said shafts and extending across the axis of said bearings, there being means on said shafts for moving the tool holder bodily so that each point in the tool holder moves in a circle upon rotation of the shafts; two tools in said tool holder; and a connection between each tool and one of said shafts for feeding said tool toward the other tool in said tool holder.

13. A crank shaft lathe comprising a frame; a bearing in the frame adapted to hold each of the journals of an engine crank shaft; and a pair of cutting tools mounted in the frame, one of the cutting tools being adapted to cut a crank pin of said engine crank shaft on the under side of the latter and the other cutter of said pair being adapted to cut said crank pin at the upper side of the latter.

14. A crank shaft lathe comprising a frame; means in the frame for supporting an engine crank shaft and rotating the latter; and a plurality of pairs of cutters slidably mounted in the frame and adapted to cut all of the crank pins of an engine crank shaft in said means at one time, one of the cutters of each pair being adapted to cut one of the crank pins from its lower side and the other cutter of each pair being adapted to cut such crank pin from its upper side thereof.

15. A crank shaft lathe comprising a frame; means in the frame for supporting an engine crank shaft and rotating the latter; a plurality of pairs of cutters slidably mounted in the frame and adapted to cut all of the crank pins of said engine crank shaft at one time; and means for moving all of the cutters toward the crank pin simultaneously to finish said crank pins with one forward movement of each cutter.

16. A crank shaft lathe comprising a frame; means in the frame for supporting a crank shaft and rotating the latter; and tool holders mounted in the frame and having openings therein of sizes just large enough for the passage of an engine crank shaft through such openings for gaging said crank shaft.

17. A crank shaft lathe comprising a frame; engine crank shaft holders journaled in the frame; a plurality of crank shafts journaled in the frame and having worm teeth on the crank pins thereof; a tool holder journaled on said crank pins; tool blocks slidably mounted in the tool holder; and driving connections between the tool blocks and the worm threads of said crank pins for automatically feeding the tool blocks toward the crank pins of said engine crank shaft.

18. A crank shaft lathe comprising a frame; engine crank shaft holders journaled in the frame; a plurality of crank shafts journaled in the frame and having worm teeth on the crank pins thereof; a tool holder journaled on said crank pins; a tool block slidably mounted in the tool holder; a member having a cam surface attached to said tool block; a worm wheel meshing with said worm teeth; and a rotary member connected with the worm wheel and having a cam surface thereon engaging the cam surface of the member attached to the tool block so that rotary movement of the second-mentioned cam member moves the tool block toward the crank pin of said engine crank shaft.

19. A crank shaft lathe comprising a frame; means for supporting and rotating an engine crank shaft in the frame; a tool holder mounted in the frame; and two tools mounted in the tool holder and spaced apart a distance to determine the size of a crank pin to be cut on said engine crank shaft.

20. A crank shaft lathe comprising a frame; means for supporting and rotating an engine crank shaft in said frame; a tool holder mounted in the frame; a tool mounted in the tool holder and adapted to cut at the upper side of a crank pin of said crank shaft; and a tool mounted in the tool holder adapted to cut at the under side of said crank pin, said tools being spaced apart a distance to determine the diameter of said crank pin.

21. A crank shaft lathe comprising a frame; shaft rotating means in the frame; a shaft at each side of and connected to rotate with the crank shaft rotating means; a plurality of crank pin turning tools arranged to present cutting edges to a crank pin of a shaft to be turned in opposition to each other, and a tool holder mounted on and adapted for movement eccentrically to the axis of said shafts, said tool holder supporting said tools and adapted to hold the cutting edges of the latter in operative relation to a crank pin of a crank shaft in said crank shaft rotating means.

22. A crank shaft lathe comprising a frame; crank shaft rotating means in the frame; a shaft at each side of and connected to rotate with the crank shaft rotating means, an eccentric on each shaft; a tool holder suported by and mounted on said eccentrics; a plurality of tools mounted in the tool holder arranged to present cutting edges to a crank pin of a shaft to be turned in opposition to each other; and means for feeding the tools in the tool holder toward each other to engage the crank pin to be turned.

23. A crank shaft lathe comprising a frame, shaft rotating means in the frame, a shaft at each side of and connected to rotate with the crank shaft rotating means; a crank pin turning tool arranged to present a cutting edge to a crank pin of a shaft to be turned, a tool holder mounted on and adapted for movement eccentrically to the axis of said shafts, said tool holder supporting said tool and adapted to hold the cutting edge thereof in operative relation to said crank pin in said crank shaft rotating means, and power means for feeding said tool holder and hence the tool therein, toward the said crank pin.

February 17, 1928.

LOUIS J. KIRCHENBAUER.